No. 634,532. Patented Oct. 10, 1899.
J. MANEY & J. STOEVER.
HAND TRUCK.
(Application filed May 5, 1899.)
(No Model.)
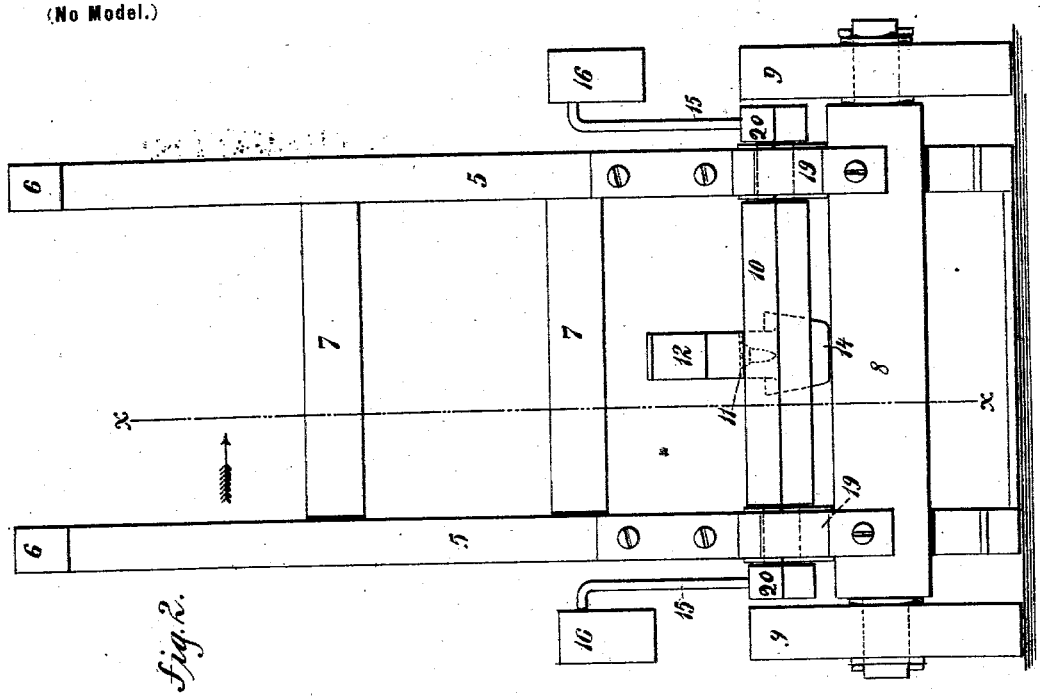
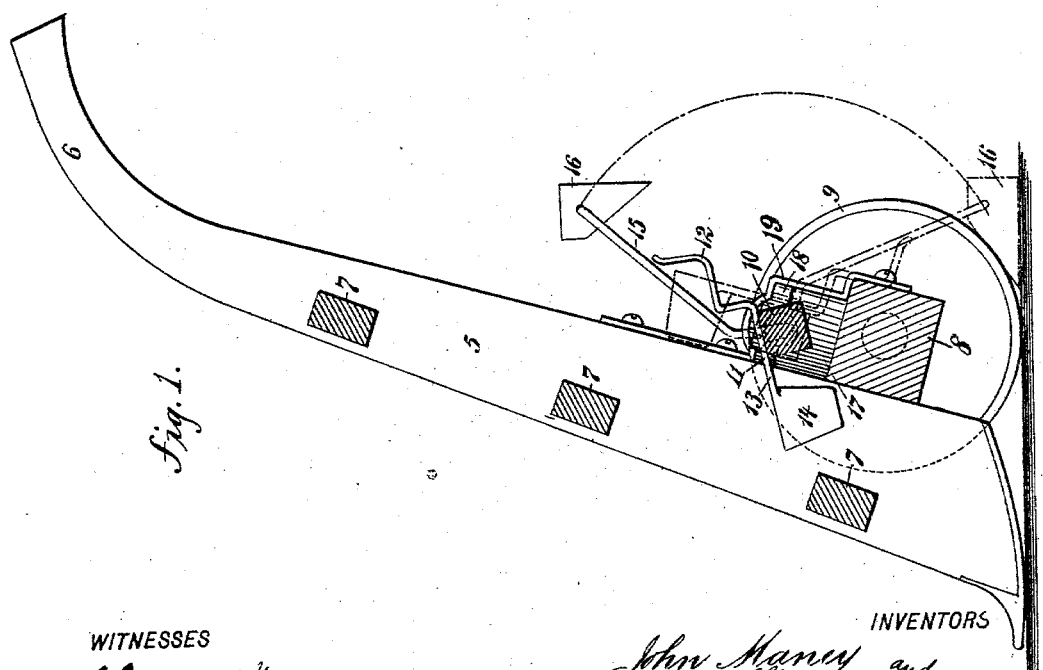
WITNESSES
INVENTORS
John Maney and
John Stoever
BY
Edgar Gale & Co
ATTORNEYS

UNITED STATES PATENT OFFICE.

JOHN MANEY AND JOHN STOEVER, OF RICHFIELD PARK, NEW JERSEY; SAID STOEVER ASSIGNOR TO SAID MANEY.

HAND-TRUCK.

SPECIFICATION forming part of Letters Patent No. 634,532, dated October 10, 1899.

Application filed May 5, 1899. Serial No. 715,661. (No model.)

*To all whom it may concern:*

Be it known that we, JOHN MANEY, a subject of the Queen of Great Britain, and JOHN STOEVER, a citizen of the United States, both residing at Richfield Park, in the county of Bergen and State of New Jersey, have invented certain new and useful Improvements in Hand-Trucks, of which the following is a full and complete specification, such as will enable those skilled in the art to which it appertains to make and use the same.

This invention relates to hand-trucks for use in moving heavy freight, barrels, boxes, and other packages; and the object of the invention is to provide improved means for holding a truck of this class in an upright position.

The invention is fully disclosed in the following specification, of which the accompanying drawings form a part, in which—

Figure 1 is a sectional side view of a hand-truck provided with our improvement, the section being taken on the line *x x* of Fig. 2 and the truck being held in an upright position; and Fig. 2, a back view thereof.

In the drawings forming part of this specification the separate parts of our improvement are designated by the same numerals of reference in each of the views, and in said drawings we have shown an ordinary hand-truck comprising sides 5, provided with handles 6 and connected by cross-bars 7. The sides 5 are preferably wider at one end than at the other, and secured to the wider end thereof is an axle 8, on the ends of which the wheels 9 are mounted, all these features of construction being the same as those usually employed in devices of this class.

Mounted rearwardly of the axle 8 is a supplemental axle or shaft 10, to the center of which is secured, and transversely thereof, a metal strip 11, provided with a backwardly-curved angular arm 12 and a forwardly-directed extension 13, the end of which is provided with a weight 14.

Secured to the ends of the axle or shaft 10 are arms 15, each of which is provided with a wedge-shaped shoe 16, and the axle or shaft 10 is adapted to be turned in its supports, so as to throw the wedge-shaped shoe 16 under the wheels 9 of the truck, as shown in dotted lines in Fig. 1.

The axle or shaft 10 in the construction shown in the drawings is provided adjacent to each end with bearings composed of separate parts 17 and 18, which are held in place by keepers 19, bolted or screwed to the bottom of the axle 8 and the side bars of the truck, and said axle or shaft is angular in cross-section; but other forms of construction may be adopted, and said axle or shaft may be of any desired form and may be supported in any preferred manner.

The brake-shoes 16 are preferably pivotally connected with the arms 15, and in the operation of the device the shaft or axle 10 and the arms 15 are normally held in the position shown in full lines in Fig. 1 by the weight 14, and whenever it is desired to hold the truck in an upright position, as shown in said figure, the shaft or axle 10 is turned by the backwardly-directed angular arm 12 of the strip 11, the foot being applied to said arm for this purpose, and the arms 15 of said shaft or axle are thrown downwardly, and the brake-shoes 16 pass beneath the wheels 9 of the truck, as is shown in said figure, and hold the truck in an upright position.

In the construction herein shown the shaft or axle 10 is provided at each end with a head 20, formed integrally therewith, and between the heads 20 and the body portion of the shaft or axle are cylindrical portions, to which the bearings 17 and 18 are applied, and the said bearings are held in place by the keepers 19, which consist of angular metal strips bolted to the shaft or axle 8 and to the bottom of the side pieces 5 of the truck-frame.

The form of the metal strip or plate 11, with which the weight 14 is connected, and the position of said weight are such that the latter normally operates to hold the arms 15 in a raised position when said arms are not in use, and also to hold said arms in the lower position (shown in dotted lines in Fig. 1) when said arms are turned downwardly, as hereinbefore described, this operation of said weight being clearly shown in Fig. 1, in which both positions are represented, one being in dotted lines.

Our improvement is applicable to any style or construction of trucks of the class described, and changes in and modifications of the construction of our improvement as herein shown and described may be made without departing from the spirit of our invention or sacrificing its advantages.

Having fully described our invention, we claim as new and desire to secure by Letters Patent—

1. A hand-truck provided with the usual axle and wheels, a shaft mounted rearwardly thereof and provided at its ends with arms having brake-shoes, a cross-strip secured centrally to said shaft and provided with a backwardly-directed arm, and a forwardly-directed weighted extension, said weighted extension being adapted to hold the arms of said shaft either in a raised or lowered position, substantially as shown and described.

2. A hand-truck provided with the usual axle and wheels, a shaft mounted rearwardly thereof and provided at its ends with arms carrying brake-shoes, and a cross strip or plate secured to said shaft and provided with end projections, one of which is provided with a weight which is adapted to hold said arms either in a raised or lowered position, substantially as shown and described.

3. A hand-truck provided with the usual axle and wheels, a shaft mounted rearwardly thereof and provided at its ends with arms carrying brake-shoes, a cross strip or plate secured to said shaft and provided with forwardly and backwardly directed extensions, one of which is provided with a weight which is adapted to hold said arms either in a raised or lowered position, said shaft being also provided with bearings composed of separate parts held in place by angular strips secured to the frame of the vehicle, substantially as shown and described.

4. A hand-truck provided with the usual axle and wheels, and a shaft mounted rearwardly thereof in bearings composed of separate parts held in place by angular strips secured to the frame of the truck, said shaft being provided with end arms having brake-shoes, and means for holding said arms either in a raised or lowered position, substantially as shown and described.

In testimony that we claim the foregoing as our invention we have signed our names, in presence of the subscribing witnesses, this 4th day of May, 1899.

JOHN MANEY.
JOHN STOEVER.

Witnesses:
F. A. STEWART,
V. M. VOSLER.